(12) United States Patent
Nishikubo et al.

(10) Patent No.: US 12,270,934 B2
(45) Date of Patent: Apr. 8, 2025

(54) TRANSCEIVER SYSTEM OF PULSE SIGNAL AND METHOD

(71) Applicant: Furuno Electric Co., Ltd., Hyogo (JP)

(72) Inventors: Daisuke Nishikubo, Takarazuka (JP); Takashi Matsumura, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 447 days.

(21) Appl. No.: 17/938,400

(22) Filed: Oct. 6, 2022

(65) Prior Publication Data

US 2024/0118383 A1    Apr. 11, 2024

(51) Int. Cl.
*G01S 7/292* (2006.01)
*G01S 3/48* (2006.01)

(52) U.S. Cl.
CPC .......... *G01S 7/292* (2013.01); *G01S 3/48* (2013.01)

(58) Field of Classification Search
CPC .......... G01S 7/41; G01S 13/282; G01S 13/28; G01S 7/285; G01S 7/292; G01S 7/352; G01S 15/8961; G01S 7/52026; G01S 7/527; G01S 13/42; G01S 7/03; G01S 7/282; G01S 7/354; G01S 7/487; G01S 7/288

See application file for complete search history.

(56) References Cited

U.S. PATENT DOCUMENTS

| | | | |
|---|---|---|---|
| 5,140,332 A * | 8/1992 | Martin | G01S 13/282 342/134 |
| 5,872,628 A * | 2/1999 | Erskine | G01S 17/58 356/4.09 |
| 8,391,344 B2 | 3/2013 | Watanabe et al. | |
| 9,194,946 B1 * | 11/2015 | Vacanti | G01S 13/286 |
| 9,506,896 B2 | 11/2016 | Hwang et al. | |
| 11,885,870 B2 * | 1/2024 | Harnett | G01S 7/2883 |
| 2020/0326416 A1 * | 10/2020 | Albasha | G01S 13/02 |

FOREIGN PATENT DOCUMENTS

GB    2196810 A *    5/1988 .......... G01S 7/021

* cited by examiner

*Primary Examiner* — Olumide Ajibade Akonai
(74) *Attorney, Agent, or Firm* — Alleman Hall & Tuttle LLP

(57) ABSTRACT

A transceiver system of a pulse signal is provided with a transmission signal generator configured to generate a transmission signal, a transceiver configured to transmit a pulse signal corresponding to the transmission signal and receive an echo signal corresponding to the transmission signal from a detection range, a pulse compression filter configured to compress the echo signal received by the transceiver, and an echo-stretch filter configured to stretch the compressed echo signal with a group of weight elements being set larger for a center and being set smaller for edge sides in a depth direction.

19 Claims, 14 Drawing Sheets

| n | Transmission Signal Value T(n) | Compressed Signal Value C(n) | Stretched Signal Value S(n) |
|---|---|---|---|
| 0 | 0 | 0 | 0 |
| 1 | 19 | 0 | 0 |
| 2 | 64 | 0 | 0 |
| 3 | 91 | 70 | 100 |
| 4 | 100 | 100 | 100 |
| 5 | 91 | 70 | 100 |
| 6 | 64 | 0 | 0 |
| 7 | 19 | 0 | 0 |
| 8 | 0 | 0 | 0 |

| n | Transmission Signal Value T(n) | Compressed Signal Value C(n) | Stretched Signal Value S(n) |
|---|---|---|---|
| 0 | 0 | 0 | 0 |
| 1 | 19 | 0 | 0 |
| 2 | 64 | 0 | 17.5 |
| 3 | 91 | 70 | 60 |
| 4 | 100 | 100 | 85 |
| 5 | 91 | 70 | 60 |
| 6 | 64 | 0 | 17.5 |
| 7 | 19 | 0 | 0 |
| 8 | 0 | 0 | 0 |

| n | Transmission Signal Value T(n) | Compressed Signal Value C(n) | Stretched Signal Value S(n) |
|---|---|---|---|
| 0 | 0 | 0 | 0 |
| 1 | 19 | 0 | 0 |
| 2 | 64 | 0 | 63 |
| 3 | 91 | 70 | 90 |
| 4 | 100 | 100 | 100 |
| 5 | 91 | 70 | 90 |
| 6 | 64 | 0 | 63 |
| 7 | 19 | 0 | 0 |
| 8 | 0 | 0 | 0 |

| n | Transmission Signal Value T(n) | Compressed Signal Value C(n) | Shortened Signal Value S(n) |
|---|---|---|---|
| 0 | 0 | 0 | 0 |
| 1 | 19 | 0 | 0 |
| 2 | 64 | 0 | 19 |
| 3 | 91 | 70 | 63.7 |
| 4 | 100 | 100 | 100 |
| 5 | 91 | 70 | 63.7 |
| 6 | 64 | 0 | 44.8 |
| 7 | 91 | 70 | 63.7 |
| 8 | 100 | 100 | 100 |
| 9 | 91 | 70 | 63.7 |
| 10 | 64 | 0 | 19 |
| 11 | 19 | 0 | 0 |
| 12 | 0 | 0 | 0 |

TRANSCEIVER SYSTEM OF PULSE SIGNAL AND METHOD

TECHNICAL FIELD

The present disclosure relates to a transceiver system of a pulse signal and a method for stretching a compressed echo signal.

BACKGROUND

A fish finder is generally a device used to detect the presence of a shoal of fish, their location within the water body, distinguish each fish in the shoal of fish, and discriminate between different fish species. Typically, the fish finder includes a transmitter/transducer that transmits ultrasound waves of varied intensities into the water body, and a receiver that receives sound waves reflected from the objects such as a seabed, a shoal of fish and any other water creatures present within the water body. The fish finder then converts the received sound wave into an electronic signal and processes it to determine the presence of the shoal of fish. However, such fish finder fails to discriminate between the different fish species and distinguish each fish to measure/detect their length, due to their lower detection range and resolution. It is observed that if a transmission signal of a short pulse width is transmitted for the purpose of improving the resolution, the distance range becomes shorter. Conversely, if the transmission signal of the long pulse width is transmitted for the purpose of improving the distance range, the resolution decreases. But it is a necessary task for fishermen to discriminate among different fish species and distinguish each fish based on its length.

Currently, a technological aspect to increase the detection range and resolution of the fish finder is a frequency-modulation of the transmission signal before transmission, and pulse compression of a received echo signal with a matched filter to accomplish a desired long detection range and improved resolution. However, it is observed that an echo image corresponding to or denoting the fish on the display of the fish finder is so thin that it is barely visible causing measurement of fish length and distinguishing the fish troublesome, when the fish finders perform the pulse compression on the received echo signal.

Further, to increase visibility of the echo image, stretching of a compressed echo signal is performed using a method of "copying the peak value by an arbitrary number of dots" and/or a method of "weighted moving average". As shown in graph 100 of FIG. 1A, where stretching of the compressed echo signal using a conventional method of "copying the peak value by an arbitrary number of dots in the depth direction", is disclosed. The graph 100 represents depth direction dot along the abscissa and a level of depth along the ordinate.

A transmission signal 102 may be first compressed into a compressed signal 104 using a compression filter. The compressed signal 104 may be further processed into a stretched signal 106, as shown in FIG. 1A. The corresponding values of the transmission signal 102, the compressed signal 104, and the stretched signal 106, are mentioned in the table 108, of FIG. 1B. According to the conventional method of "copying the peak value by an arbitrary number of dots in the depth direction", the compressed signal 104 is stretched by copying the same peak value for all the values C(n) of dots (n) of the compressed signal 104 for the corresponding dot (n) of the stretched signal 106. Therefore, multiple dots (n) of the stretched echo signal are filtered to have the peak value, as shown in table 108. Since the same peak value in the depth direction is copied to continue in multiple dots and there is no intermediate color between the peak value and the background noise, the resulting image echo becomes unnatural or a rough image with low resolution is generated.

Further, FIG. 2A is a graph 200 showing stretching of the compressed signal 104 using a conventional method of "weighted moving average", according to the prior art. The graph 200 represents a depth direction dot along the abscissa and a level of depth along the ordinate. It is to be noted that when the graph 200 of FIG. 2A is displayed on the display screen. The corresponding values of the transmission signal 102, the compressed signal 104 and the stretched signal 106, are mentioned in the table 202, of FIG. 2B. According to the conventional method of "weighted moving average", the compressed signal 104 is stretched by performing the weighted moving average of the values C(n) of the dots (n) of the compressed signal 104 with the weight W={0.25, 0.5, 0.25} to filter the values S(n) of the corresponding dots (n) of the stretched signal 106 using the equation, $$S(n)=0.25*C(n-1)+0.5*C(n)+0.25*C(n+1) \tag{1}$$

In this conventional method, each value S(n) of the dot (n) of the stretched signal 106 is filtered by the conventional compression filter using the equation (1) as disclosed above.

For example, when referred to the table 202 of FIG. 2B, and calculated the value S(3) corresponding to the dot n=3 of the stretched signal 106 using the equation (1), $$\begin{aligned} S(3) &= 0.25*C(n-1)+0.5*C(n)+0.25*C(n+1) \\ &= 0.25*0+0.5*70+0.25*100 \\ &= 60 \end{aligned}$$

Similarly, when the peak value S(4) corresponding to the dot 4 of the stretched signal 106, is calculated using the same equation (1), then the resulting value S(4) for the dot 4 is 85 which is lower than the value T(4) of the corresponding dot (n=4) of the transmission signal 102 and the value C(4) of the corresponding dot (n=4) of the compressed signal 104.

Therefore, the number of dots to be copied or the number of dots used for the weighted moving average remain constant causing a pulse width of the stretched signal 106 to be constant for all types of display screens regardless of the display range or the display resolution of the display screen being used in the fish finder. Since a filter length is not defined to correct the pulse width of the compressed signal 104 based on the display range or the display resolution of the display screen being used. Thus, the pulse width of the stretched signal 106 may be excessive or insufficient corresponding to a change in the display range or the display resolution. Further, in the "weighted moving average" method, the level of the dot of the stretched signal 106 is lowered from the peak value. The level is lowered due to the average of the peak level of the transmission signal 102 and the compressed signal 104. The compressed signal 104 may correspond to a reduced signal which is obtained by decreasing the value of weights of the transmission signal 102, along the depth direction as shown in FIG. 2A. Such drop in the level adversely affects the fish length measurement and species discrimination by the fish finder.

In view of these problems, it is an object of the present disclosure to provide a system and a method capable of sufficiently stretching and filtering the echo signal shortened by pulse compression for easy discrimination and distinguishing based on the type and length of the fish.

SUMMARY

The present disclosure discloses a transceiver system of a pulse signal, a method, and a non-transitory computer-readable medium that may stretch a compressed echo signal to provide a highly visible image while maintaining the high signal to noise (S/N) ratio. An aspect of the present disclosure relates to a transceiver system of a pulse signal, provided with a transmission signal generator, a transceiver, a pulse compression filter, and an echo-stretch filter. The transmission signal generator may be configured to generate a transmission signal. The transceiver may be configured to transmit a pulse signal corresponding to the transmission signal. The transmitted pulse signal may be having substantially a same waveform as a waveform of the transmission signal. Further, the transceiver may be configured to receive an echo signal corresponding to the transmission signal from a detection range. Further, a pulse compression filter may be configured to compress the echo signal received by the transceiver. Thereafter, an echo-stretch filter may be configured to stretch the compressed echo signal with a group of weight elements being set larger for a center and being set smaller for edge sides in a depth direction. The echo-stretch filter may be a weighted maximum value filter.

The echo-stretch filter may be configured to calculate a difference between a pulse width of the compressed echo signal and a pulse width of the transmitted pulse signal in terms of a number of dots; and determine a filter length based on the calculated difference. The filter length may be set in a depth direction, for correcting the pulse width of the compressed echo signal being shortened by pulse compression. Further, the echo-stretch filter may be configured to stretch the compressed echo signal with the group of weight elements being set larger for a newer pings and smaller for older pings in a time direction.

BRIEF DESCRIPTION OF THE DRAWINGS

FIG. 1B is a table representing values of a graph shown in FIG. 1A, according to the prior art;

FIG. 2B is a table representing values for a graph shown in FIG. 2A, according to the prior art;

FIG. 4B is a table representing values for a graph shown in FIG. 4A, according to an embodiment of the present disclosure;

FIG. 10B is a table representing values for a graph shown in FIG. 10A, according to another embodiment of the present disclosure.

DETAILED DESCRIPTION

Figure 1A:
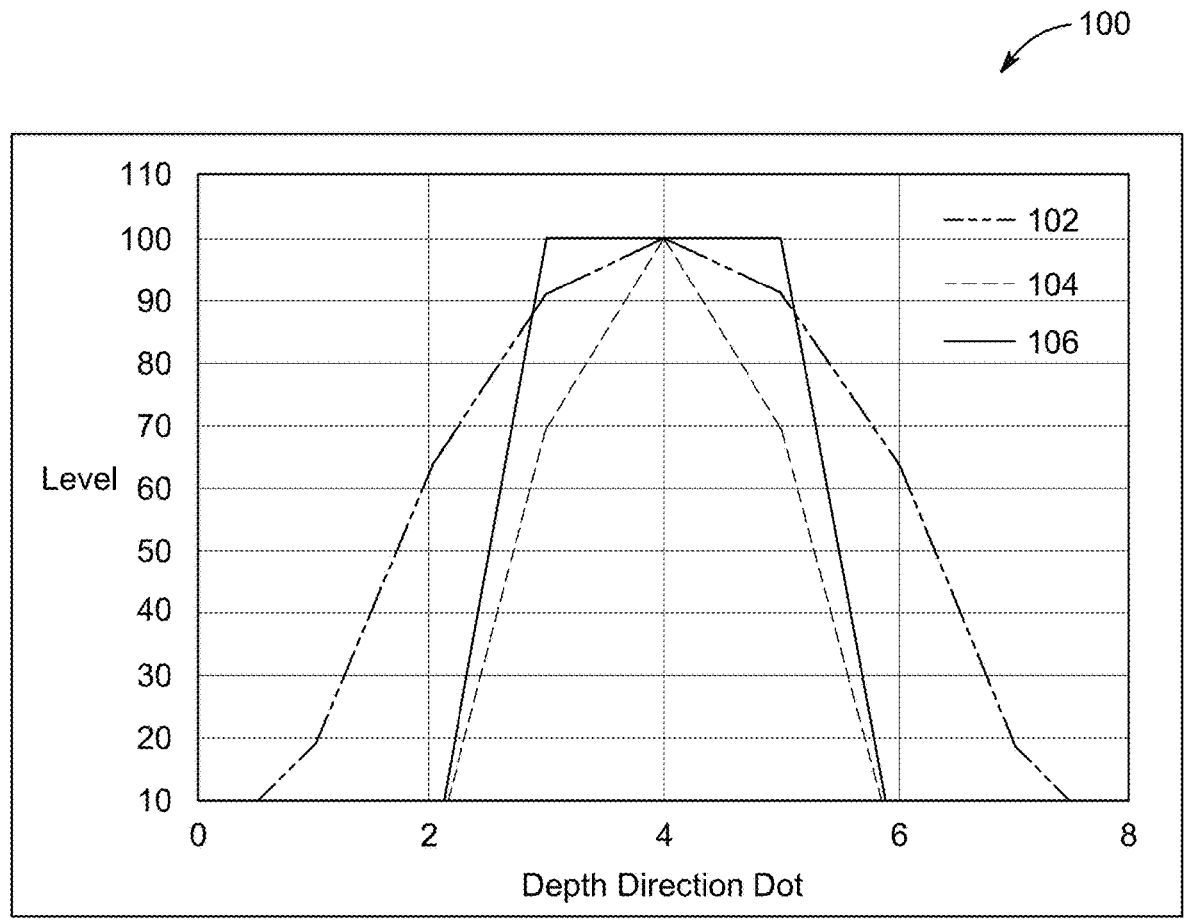
FIG. 1A is a graph showing stretching of a compressed signal using a conventional method of "copying the peak value by an arbitrary number of dots in the depth direction", according to the prior art.
Figure 2A:
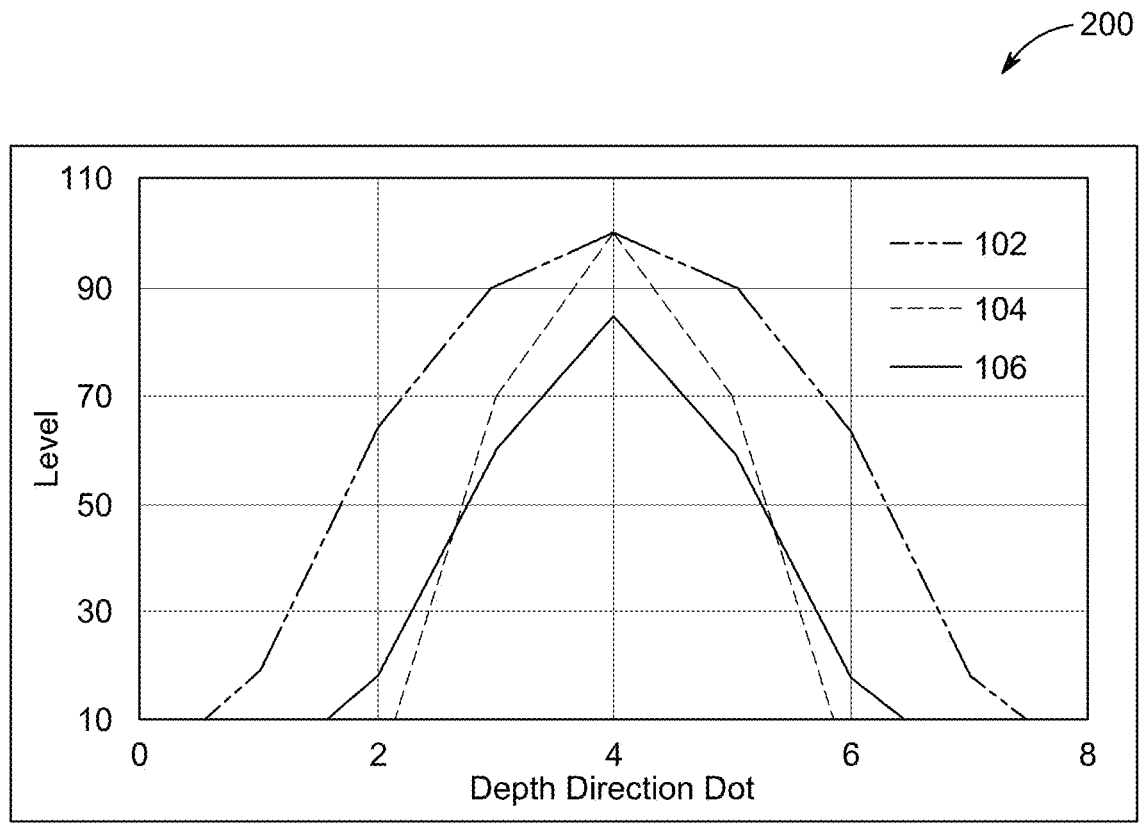
FIG. 2A is a graph showing stretching of a compressed signal using a conventional method of "weighted moving average", according to the prior art.

Embodiments of the present disclosure will be described below with reference to the drawings. The same reference numerals are given to the same or corresponding parts in the figure, and the description thereof will not be repeated. At least some of the embodiments described below may be arbitrarily combined.

A transceiver system of a pulse signal is used for detecting objects such as a shoal of fish, any other water creatures, and a seabed present in the seawater. The pulse signal, generally, is an ultrasonic pulse of varying intensities. The ultrasonic pulse as a transmission signal is transmitted under the water which is reflected by the objects present under the water.

A reflected echo signal is received by the transceiver system, which is processed further to extract the information of the presence of the shoal of fish and distinguish and discriminate between each fish from the shoal of fish.

The ultrasonic pulse from the transceiver system is transmitted directly underneath a ship. An echo signal is received from the corresponding transmitted ultrasonic pulse. Further, the received echo signal is converted into an electrical signal, amplified, compressed, and again stretched to display an enhanced echo image on a display screen, to improve distance resolution.

An aspect of the present disclosure is the transceiver system of a pulse signal that eliminates the abovementioned limitations. The transceiver system stretches a pulse width of an echo-signal shortened by the pulse compression and provides highly visible images of an individual fish from the shoal of fish, while maintaining a high signal to noise ratio (SNR).

Further, the transceiver system calculates an ideal filter length for an echo-stretch filter resulting in stretched pulse width of the compressed echo signal, depending on the range and the resolution of the display screen. The stretched pulse width of the compressed echo signal may be suitable according to the range and distance resolution of the display screen. Therefore, the transceiver system provides a clear and visible echo image over the display screen.

Additionally, the compressed echo signal is stretched to filter the weighted maximum value using the echo-stretch filter to keep a peak value of the stretched echo signal at a same level as the peak level of a corresponding transmission signal. The echo-stretch filter is a weighted maximum value filter with a maximum value of weight set to 1.0.

Figure 3:
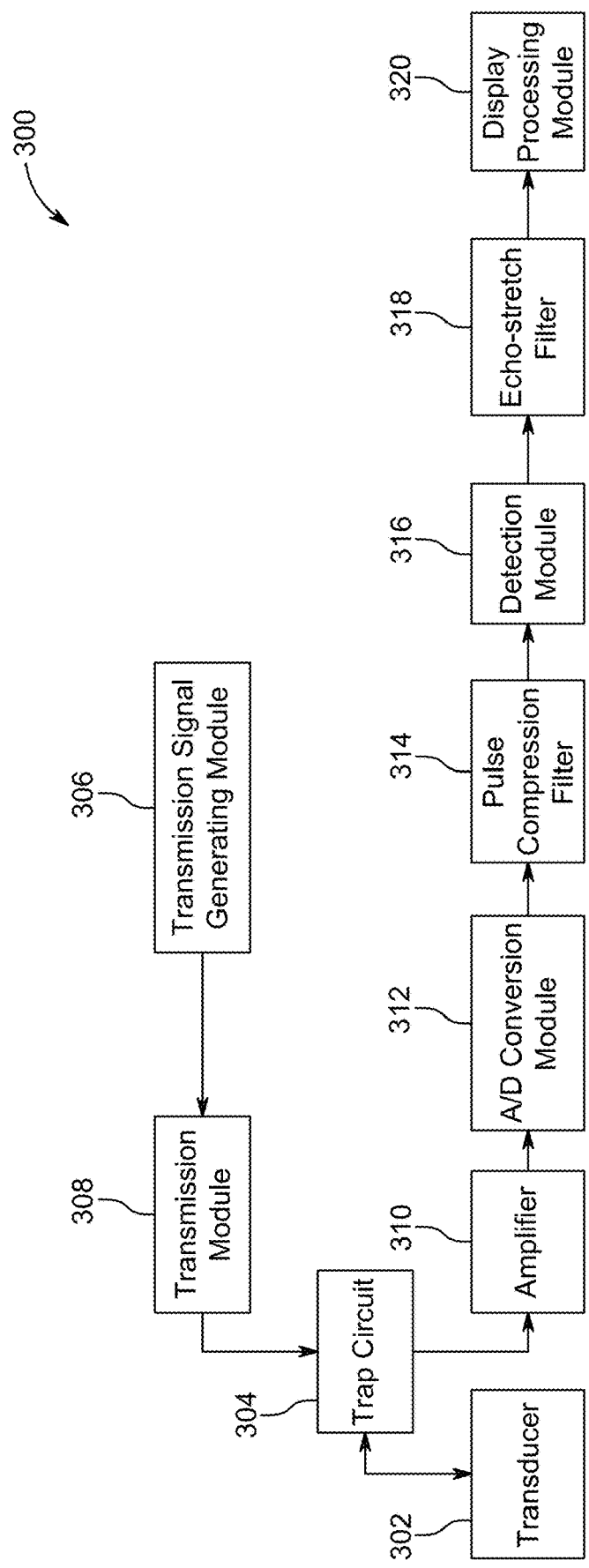
FIG. 3 is a block diagram showing a configuration of a transceiver system, according to an embodiment of the present disclosure.

FIG. 3 is a block diagram showing a configuration of a transceiver system 300, according to an embodiment of the present disclosure. The transceiver system 300 may be a fish finder system used to locate the shoal of fish under a water body.

Referring to FIG. 3, the transceiver system 300 may be installed on a ship or a boat, to detect the shoal of fish. The transceiver system 300 comprises a transducer 302, a trap circuit 304, a transmission signal generating module 306 (a transmission signal generator), a transmission module 308 (a transmitter), an amplifier 310, an analog to digital (A/D) conversion module 312 (an A/D converter), a pulse compression filter 314, a detection module 316 (an envelope detector), an echo-stretch filter 318, and a display processing module 320 (a display processor).

The transducer 302 may be driven by an electric signal supplied from the transmission module 308 through the trap circuit 304 to transmit, an ultrasonic pulse signal inside the water body.

Further, the transducer 302 may receive an echo signal reflected from different objects including the shoal of fish, bottom surface or any other object present within the water body. It may be noted that the transmitted ultrasonic pulse signal may have a waveform as the waveform of the frequency modulated transmission signal generated by the transmission signal generating module 306. Thereafter, the transmission module 308 may transmit the transmission signal to the transducer 302 through the trap circuit 304. It may be noted that the transducer 302, the trap circuit 304, and the transmission module 308 may be collectively referred to as a "transceiver".

Further, the transducer 302 may transmit the received echo signal to the amplifier 310 of the transceiver system 300 through the trap circuit 304. The amplifier 310 amplifies the received echo signal and outputs an amplified signal to the A/D conversion module 312. The A/D conversion module 312 converts the amplified signal into a digital signal. The digital signal is then compressed by the pulse compression filter 314 and detected by the detection module 316. The pulse compression filter 314 may be configured for pulse compressing the echo signal received by the transceiver. Further, the pulse compression filter 314 performs pulse compression with a window function having a shape such that a phase spectrum of an output signal corresponding to the received echo signal is a linear function of frequency.

Figure 4A:
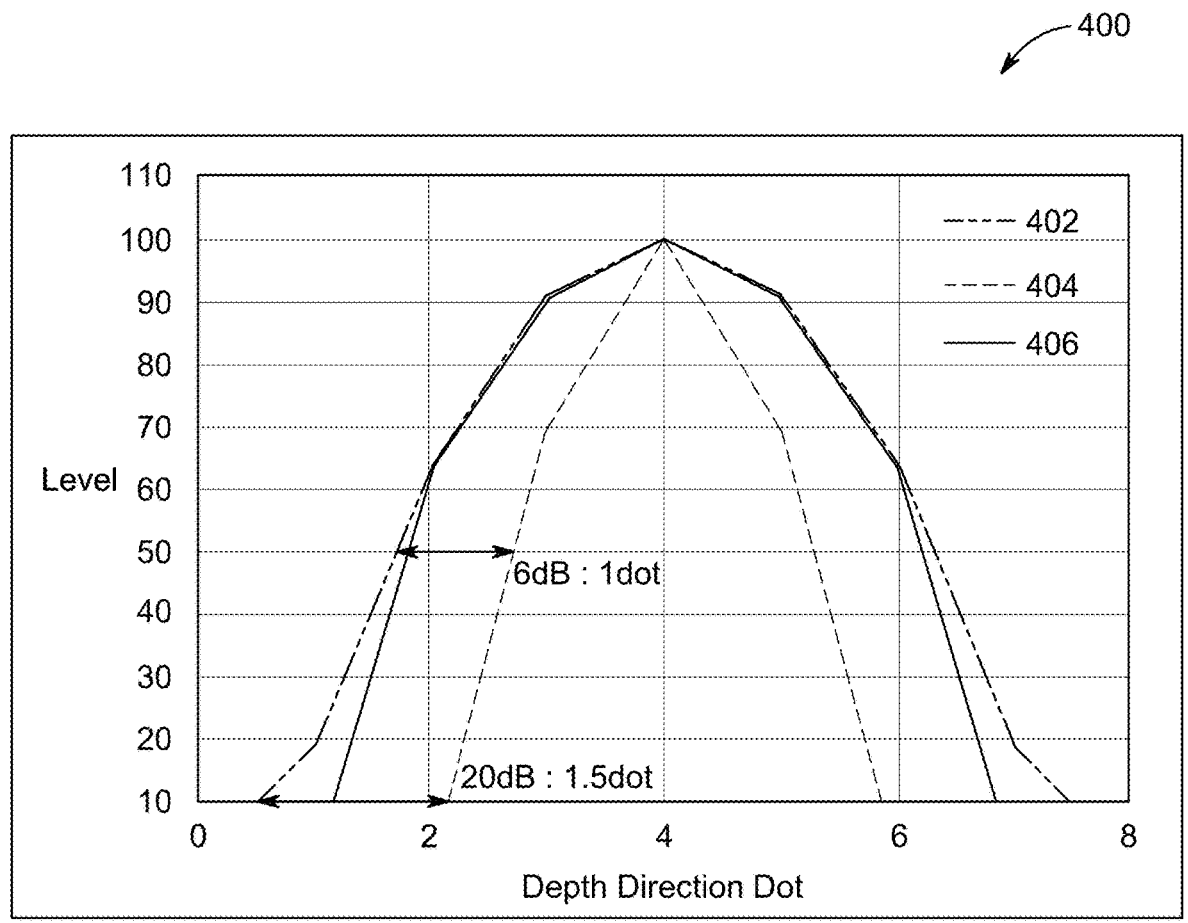
FIG. 4A is a graph showing stretching of a compressed echo signal, according to an embodiment of the present disclosure.

Further, the compressed echo signal 404 is stretched by the echo-stretch filter 318. The echo-stretch filter 318 corrects the pulse width of the signal that is shortened by the pulse compression filter 314 by stretching the compressed echo signal. The echo-stretch filter 318 is configured to calculate a filter length based on a difference between a pulse width of the compressed echo signal and a pulse width of the transmitted pulse signal in terms of a number of dots, as shown in FIG. 4A. It may be noted that the filter length is set in a depth direction, for correcting the pulse width of the compressed echo signal being shortened by the pulse compression.

According to an aspect of the present disclosure, the echo-stretch filter 318 further prevents the background noise from being emphasized within the stretched echo signal 406 by calculating the filter range, determining a threshold level of dots of the compressed echo signal 404, and stretching only when the level of dots of the compressed echo signal 404 higher than the threshold level of dots is present in the filter range.

The threshold level is determined according to the compressed echo signal 404 being stretched (expanded or extended). Further, absorption attenuation is considered while determining the threshold level of dots of the compressed echo signal 404.

For instance, if the pulse width of the transmission pulse signal is 3 milliseconds (msec), then the pulse width of the compressed echo signal is 0.5 msec and the time per 1 dot is 0.5 msec. Further, the filter length calculated by echo-stretch filter 318 would be 5 as the number of dots of the transmission pulse width is 3 msec×1 dot/0.5 msec=6 dots, and the number of dots of the compressed pulse width is 0.5 msec×1 dot/0.5 msec=1 dot. Therefore, the calculated difference would be 5 dots which is defined as the filter length of the echo-stretch filter 318.

In case of a change in pulse width or change in the display range or resolution due to a change in the display screen, the time per dot or the total number of dots of transmission pulse width and the compressed pulse width will also change. Therefore, the echo-stretch filter 318 recalculates the filter length to get an optimum filter length based on the transmission pulse width, and the display range and resolution of the display screen being used before the stretch processing of the compressed echo signal.

Thereafter, the display processing module 320 displays the echo image of the water body over the display screen of the transceiver system 300. Further, the echo-stretch filter 318 adjusts the pulse width of the stretched echo signal and thereby the echo image according to a change in the display range and resolution of the display screen.

Further, the filter length in a time direction is calculated based on a transmission cycle of a transmission signal 402 to improve the visibility of the echo image. But a real time characteristic of the filter length may degrade. Therefore, the filter length in the time direction must be changed according to different purposes.

For instance, if a transmission period of the transmission signal 402 is long, then it becomes difficult to catch the fish inside the transmission signal 402. Therefore, the filter length in the time direction is changed to set long. Conversely, if the transmission period of the transmission signal 402 is short, then it becomes easy to catch the fish inside the transmission signal 402. Therefore, the filter length in the time direction is changed to set short.

In other words, if the transmission cycle is longer, then the boat may be affected more by its roll, pitch, and yaw motions. Hence, it is better to set the filter length in the time direction longer to obtain seamless echo images. Further, once the filter length is set longer, it may become difficult to distinguish whether the echo image being displayed is older one or newer one. Therefore, the filter length is set to 3 by the transceiver system 100 after consideration of the real time characteristics of the filter length.

FIG. 4A is a graph 400 showing stretching of the transmission signal 402, the compressed echo signal 404, and the stretched echo signal 406, according to an embodiment of the present disclosure.

The graph 400 represents depth direction dot along the abscissa and a level of depth along the ordinate. The echo-stretch filter 318 is a weighted maximum value filter that stretches the compressed echo signal 404 by maximum weighted filtering the values C(n) of dots (n) with a group of weighted elements which are set larger for a center and smaller for edge sides, in a depth direction. For instance, a group of weighted elements is set at 1.0 for a center and 0.9 for edges sides, i.e., W={0.9, 1, 0.9}. Further, the group of weighted elements is set larger for newer pings and smaller for older pings, in a time direction.

The echo-stretch filter 318 is configured to stretch the compressed echo signal 404 or to generate the stretched echo signal 406, by filtering the maximum value of a product of weighted elements {0.9, 1, 0.9} and the compressed signal value C(n) of the dots (n). It may be noted that the echo-stretch filter 318 may be referred as a matrix filter. The echo-stretch filter 318 may filter the maximum value out of the weighted average according to the value of the corresponding dots of the stretched echo signal 406 using the equation (2), $$S(n)=\text{MAX}[0.9 \times C(n-1), 1.0 \times C(n), 0.9 \times C(n+1)] \quad (2)$$

Wherein, n is the number of the dot on the compressed echo signal 404 corresponding to the number of the dots on the stretched echo signal 406.

Therefore, the echo-stretch filter 318 is a weighted maximum value filter with a maximum value of each weight element from the group of weight elements is set to 1.0.

Further, a difference in focus level between the compressed echo signal 404 and the transmission signal 402 may be 6 dB and 20 dB, in the depth direction. It may be noted that a user may chose the echo stretch filter 318 determines a level of focus between 6 dB (2 dots) to 20 dB (3 dots), as shown in FIG. 4A. In one embodiment, the level of focus may be determined to be at 40 dB.

In one case, the weight is set such that the amount of change is constant, and the minimum value is ⅕. In another case, any weight may be applicable if such weight is converted from the compressed echo signal 404 to the transmission signal 402.

For example, the target dot in the time direction and depth direction is deducted from a following matrix:

$$\begin{bmatrix} 3/5 & 2/5 & 1/5 \\ 4/5 & 3/5 & 2/5 \\ \langle 5/5 \rangle & 4/5 & 3/5 \\ 4/5 & 3/5 & 2/5 \\ 3/5 & 2/5 & 1/5 \end{bmatrix}$$

In general:

$$\begin{bmatrix} T[m-2,n] & T[m-2,n+1] & T[m-2,n+2] \\ T[m-1,n] & T[m-1,n+1] & T[m-1,n+2] \\ (T[m,n]) & T[m,n+1] & T[m,n+2] \\ T[m+1,n] & T[m+1,n+1] & T[m+1,n+2] \\ T[m+2,n] & T[m+2,n+1] & T[m+2,n+2] \end{bmatrix}$$

Wherein, $$T[m,n+p] > T[m\pm 1, n+p] > T[m\pm 2, n+p](p=0,1,2) \cap T[m\pm q, n] > T[m\pm q, n+1] > T[m\pm q, n+2](q=0,1,2)$$

Further, the dot <5/5> or the dot (T[m,n]) is a target dot. Further, the value of dot travels from left (current value) to right (past value) in a time direction in matrix. While the value of dot travels from top (shallow level) to bottom (deep level) in a depth direction in matrix.

FIG. 4B is a table 408 representing values for the graph 400 shown in FIG. 4A, according to an embodiment of the present disclosure.

Referring to FIG. 4B, each value S(n) of the dot (n) of the stretched echo signal 406 is filtered by the echo-stretch filter 318 by the maximum weighted filtering of the values of corresponding dots of the compressed echo signal 404 with the group of weighted elements using the equation (2).

For example, when referred to the table 408 of FIG. 4B, and the value S(3) corresponding to the dot n=3 of the stretched echo signal 406, is calculated using the equation (2), $$S(3) = \text{MAX}[0.9 * C(2), 1.0 * C(3), 0.9 * (C(4)]$$
$$= \text{MAX}[0.9 * 0, 1.0 * 70, 0.9 * 100]$$
$$= 90$$

Similarly, when the value S(4) corresponding to the dot 4 of the stretched echo signal 406, is calculated using the equation (2), then the resulting value S(4) for the dot 4 is 100 which is equivalent to the value T(4) of the corresponding dot (n=4) of the transmission signal 402 and the value C(4) of the corresponding dot (n=4) of the compressed signal 404.

Thus, the peak value S(n) for the dot (n) of the stretched echo signal 406, is same as the peak value T(n) of the corresponding dot (n) of the transmission signal 402, resulting in increased peak effect, better fish length measurement, and improved fish species discrimination.

Figure 5:
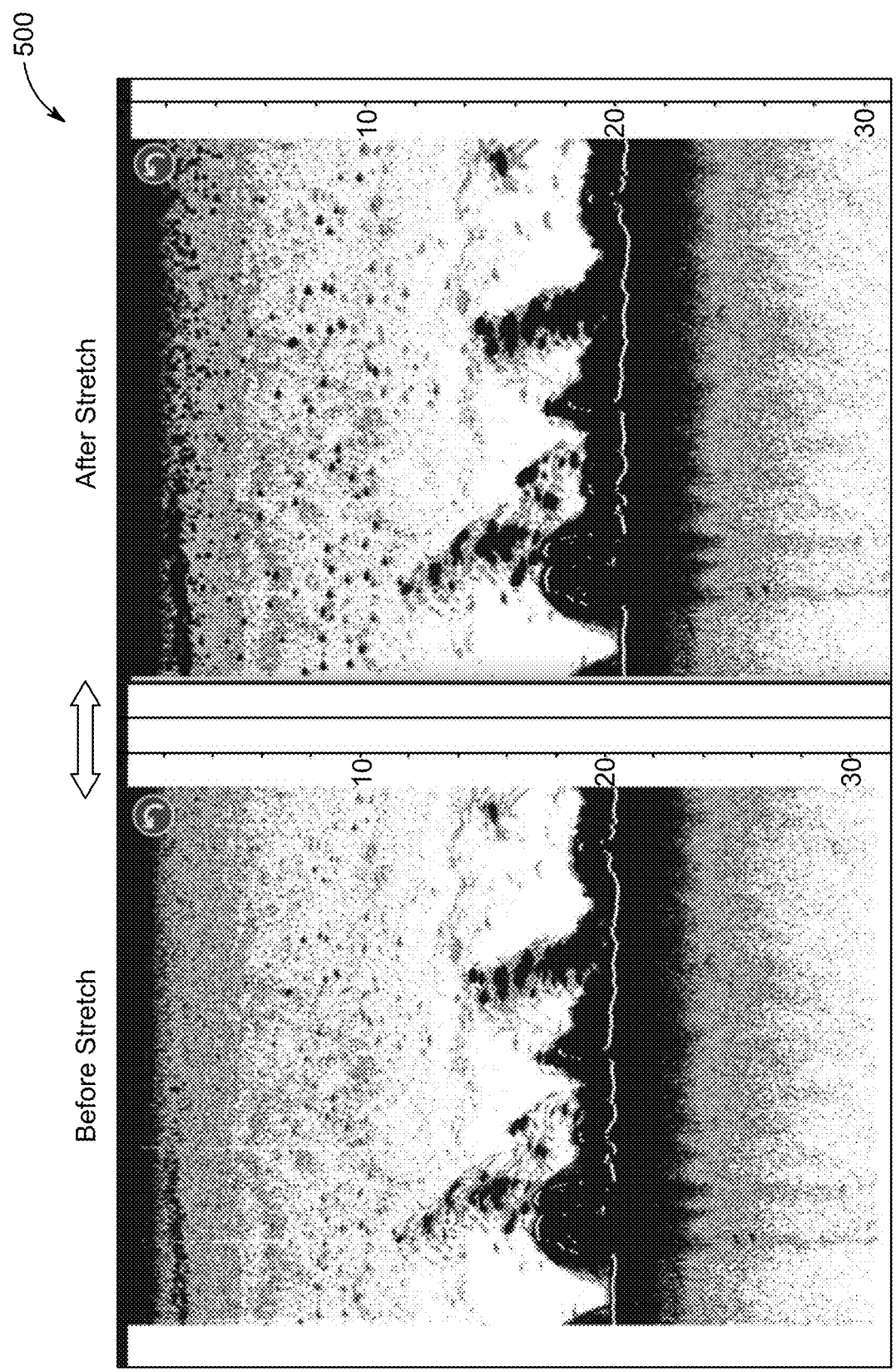
FIG. 5 is an image showing echo images of objects present within the water before and after stretching of a compressed echo signal corresponding to a transmission signal of short range and short pulse width, according to an embodiment of the present disclosure.

FIG. 5 is an image 500 showing echo images of objects present within the water before and after stretching of the compressed echo signal 404 corresponding to the transmission signal 402 of short range and short pulse width, according to an embodiment of the present disclosure.

Referring to FIG. 5, the pulse signal of short range and short pulse width, transmitted as the transmission signal 402, the visibility of the resulting echo image increases. The visibility of the echo image increases when the compressed echo signal 404 is stretched using the echo-stretch filter 318 of the present disclosure compared to the echo images of the compressed echo signal 404 that is not stretched.

Figure 6:
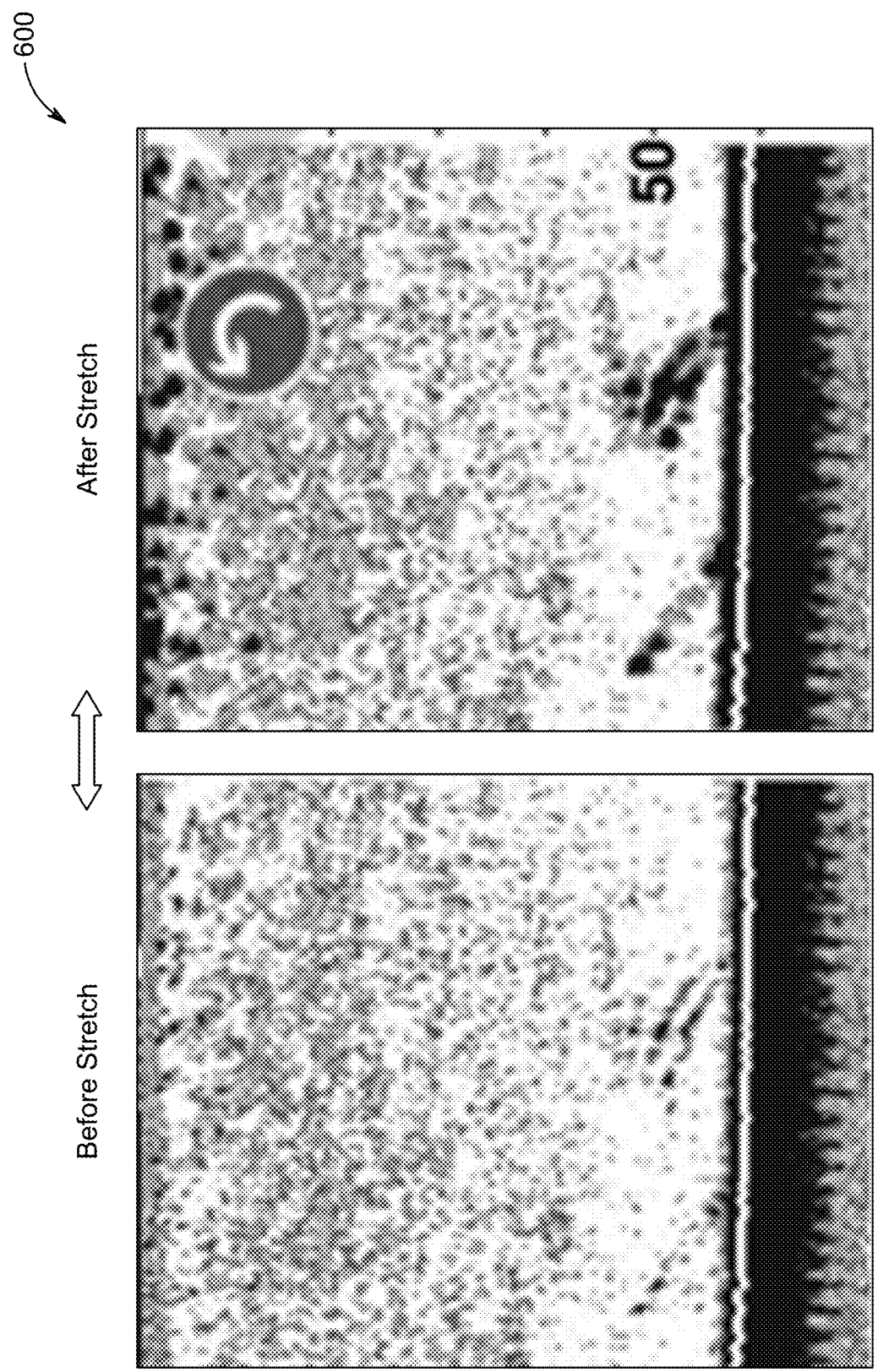
FIG. 6 is an image showing echo images of objects present within the water before and after stretching of the compressed echo signal corresponding to a transmission signal of long range and long pulse width, according to an embodiment of the present disclosure.

Conversely, FIG. 6 is an image 600 showing echo images of objects present within the water before and after stretching of the compressed echo signal 404 corresponding to the transmission signal 402 of long range and long pulse width, according to an embodiment of the present disclosure.

Referring to FIG. 6, the echo images, of the shoals of fish present within the water body, corresponding to the transmission signal 402 of long range and long pulse width, are unclear and not distinct when the compressed echo signal 404 corresponding to the transmission signal 402 is not stretched. On the other hand, the echo images of the objects are visible with enhanced resolution when the compressed echo signal 404 is processed further by echo-stretching using the echo-stretch filter 318, according to an aspect of the present disclosure.

Figure 7:
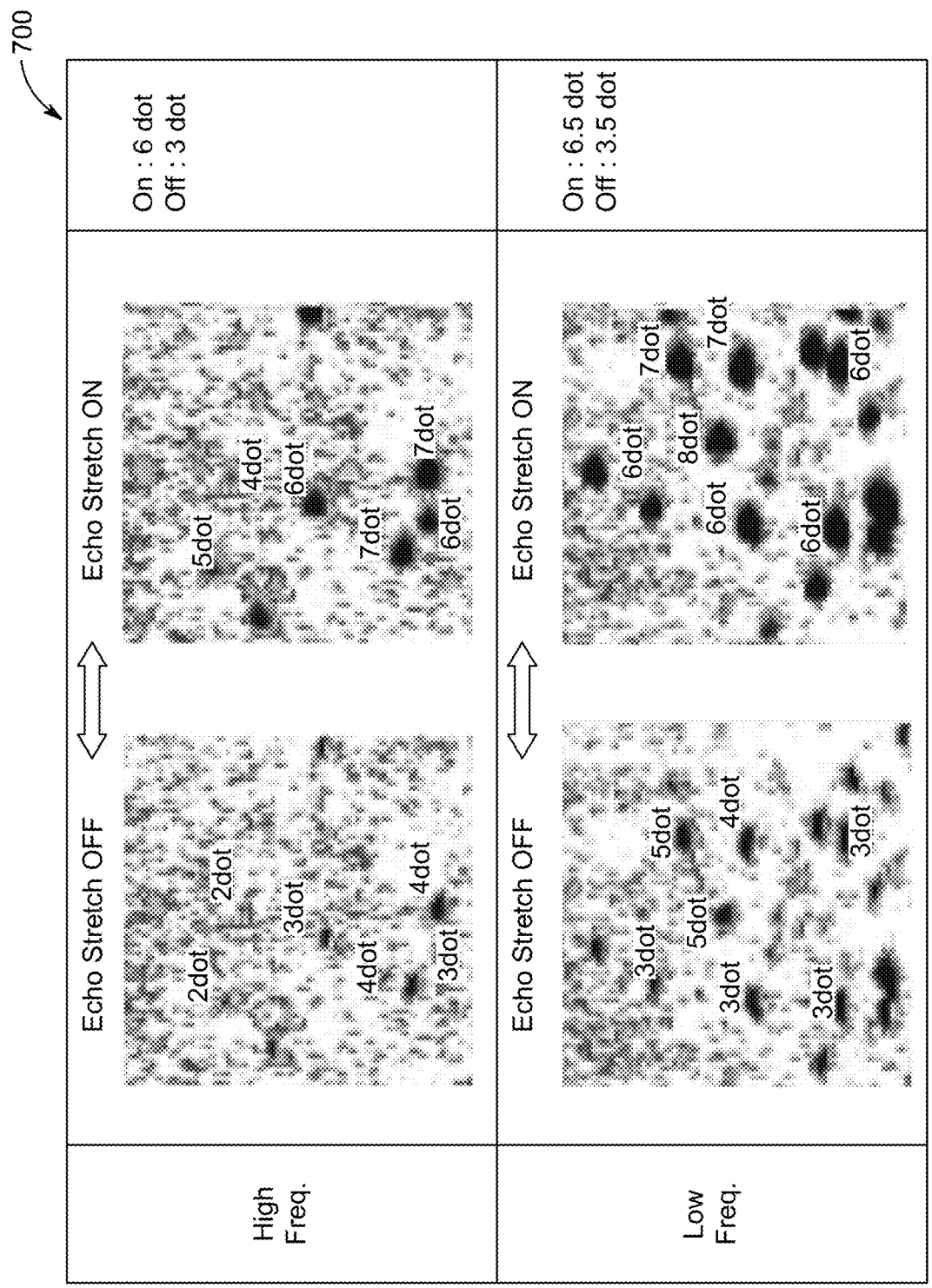
FIG. 7 is an image showing a comparison of the echo stretch OFF and ON of the compressed echo signal, according to an embodiment of the present disclosure.

Similarly, FIG. 7 is an image 700 showing comparison of the echo signal before and after stretching of the compressed echo signal 404 corresponding to the transmission signal 402, respectively at, high frequency and low frequency, according to an embodiment of the present disclosure.

The stretching process of the echo-stretch filter 318 enhances the visibility of the echo images of the objects over the display screen compared to the echo images of the pulse signal which are not stretched. The echo-stretch filter 318 enhances the visibility of the echo images regardless of the type of transmitted pulse signal as the transmission signal 402.

The transmitted pulse signal as the transmission signal 402 may include, but not limited to, a pulse signal of short range and short pulse width, a pulse signal of long range and long pulse width, a pulse signal of high frequency, and a pulse signal of low frequency.

Figure 8:
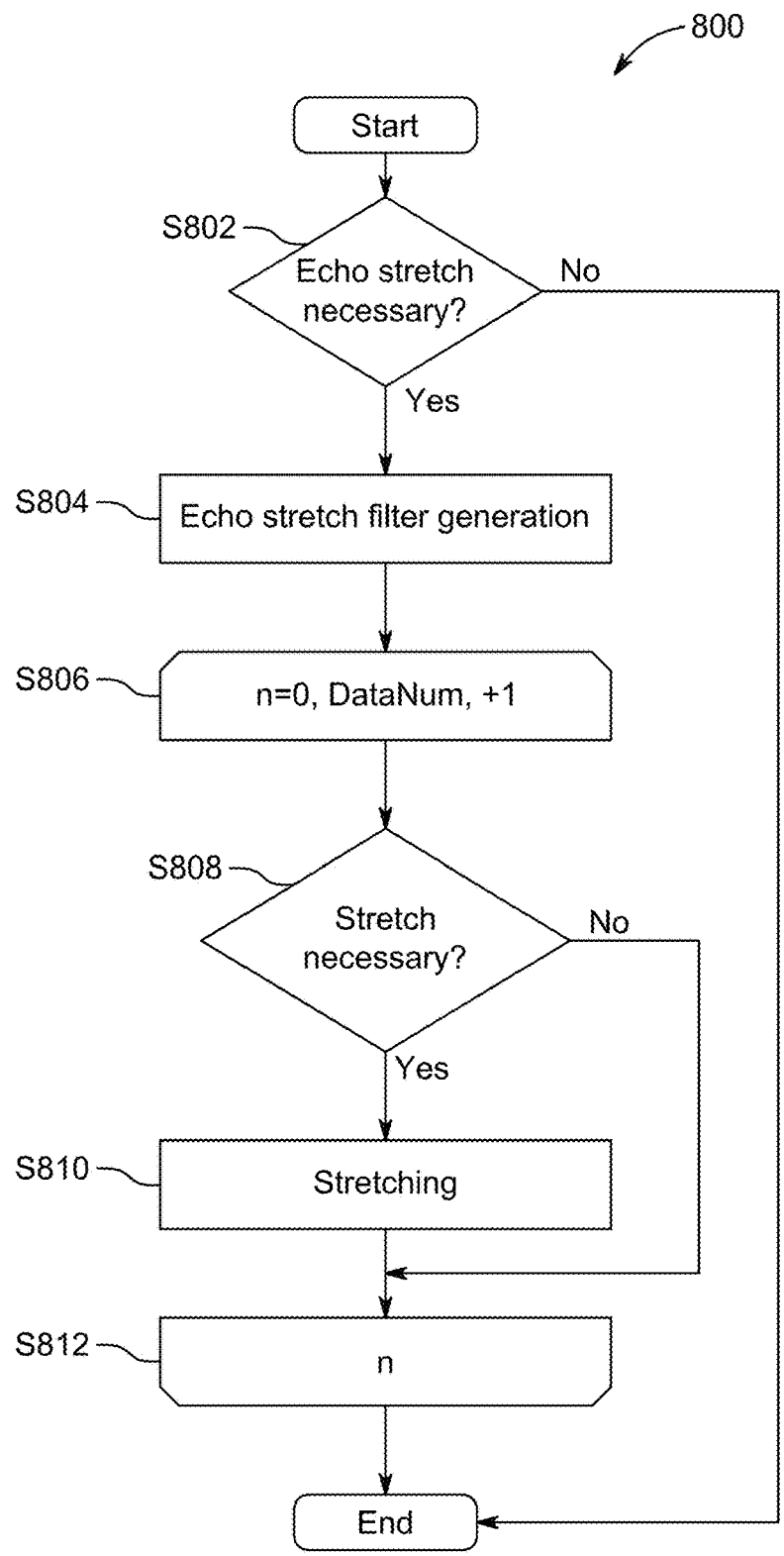
FIG. 8 is a flowchart of a method for stretching a compressed echo signal using an echo-stretch filter, according to an embodiment of the present disclosure.

FIG. 8 is a flowchart of a method 800 for stretching the compressed echo signal 404 using the echo-stretch filter 318, according to an embodiment of the present disclosure.

Referring to FIG. 8, the echo-stretch filter 318 may be configured to receive the compressed echo signal 404 from the pulse compression filter 314 and monitor said compressed echo signal 404 to determine if the echo-stretch is necessary, at step S802. For example, the echo-stretch filter 318 compares the pulse width of the transmission signal 402 with the pulse width of the compressed echo signal 404 to determine if the pulse width of the compressed echo signal 404 is being shortened by the pulse compression.

In one case, if the echo-stretch filter 318 determines no echo stretch is necessary, then the method terminates the echo stretching of the compressed echo signal 404. In another case, if the echo stretch is necessary, then the echo-stretch filter 318 generates the filter length for the echo-stretch filter generation, at step S804.

Further, the echo-stretch filter 318 stretches the compressed echo signal 404 in terms of the value of dots with the group of weighted elements to filter out the corresponding dots of the stretched echo signal 406. The value of dot of the stretched echo signal 406 depends on the value of the corresponding dot (DataNum) of the compressed echo signal 404, the value of the preceding dot (n=0), and the value of the succeeding dot (n=+1), at step S806.

Further, the echo-stretch filter 318 monitors to determine if the stretch is necessary, at step S808. As discussed earlier, the stretching of the compressed signal 404 by the echo-stretch filter 318 prevents the background noise from being emphasized within the stretched echo signal 406 by calculating the filter range, determining a threshold level of dots of the compressed echo signal 404, and stretching only when the level of dots of the compressed echo signal 404 higher than the threshold level of dots is present in the filter range.

In one case, if the echo-stretch filter 318 determines stretch is necessary, by determining the presence of the level of dots of the compressed echo signal higher than the threshold level of dots in the filter length, then the echo-stretch filter 318 continues stretching until the compressed echo signal 404 is completely stretched, at step S810.

In another case, if the echo-stretch filter 318 determines no stretch is necessary, then the method proceeds further to determine value of succeeding final dot (n) after the stretching of the compressed echo signal 404, at step S812.

Figure 9:
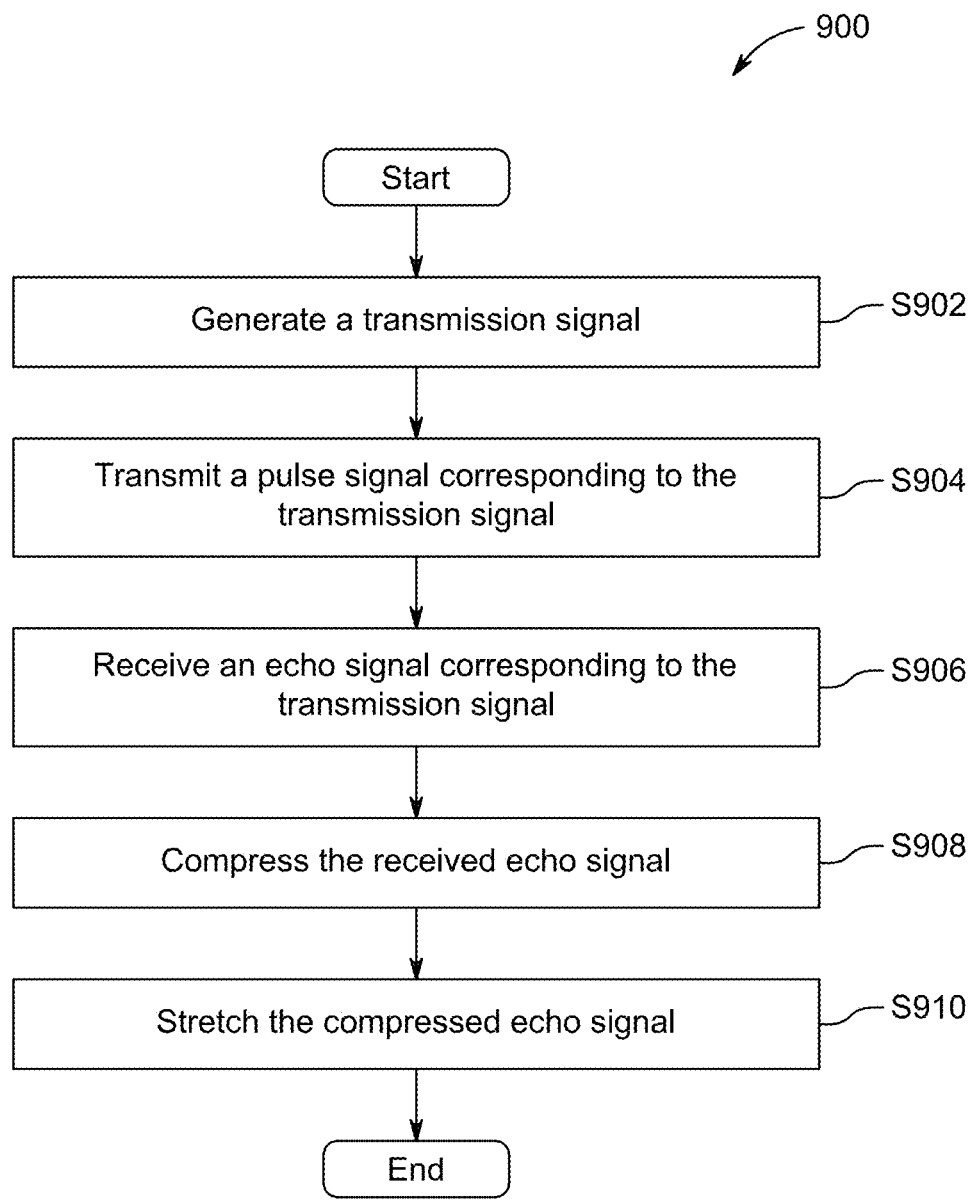
FIG. 9 is a flowchart of a method for compressing and stretching the echo signal, using a transceiver system, according to an embodiment of the present disclosure.

FIG. 9 is a flowchart of a method 900 for compressing and stretching the echo signal, using the transceiver system 300, according to an embodiment of the present disclosure.

Referring to FIG. 9, the transceiver having the transmission signal generating module 306 may generate the transmission signal 402, at step S902. It may be noted that the transmission signal 402 is frequency modulated by a predetermined frequency sweep width.

Successively, the transceiver may transmit the pulse signal corresponding to the transmission signal 402, at step S904.

Further, the transceiver may receive the echo signal corresponding to the transmission signal 402, at step S906. The echo signal may be reflected from the objects present within the water body such as a seabed, a shoal of fish, any other water creatures, or non-living objects.

Successively, the pulse compression filter 314 may compress the received echo signal, at sept S908. It may be noted that the pulse compression filter 314 compresses the echo signal received by the transceiver. The received echo signal is first amplified by the amplifier 310 and converted into the digital signal by the A/D conversion module 312 before compression by the pulse compression filter 314.

It may be noted that the detection module 316 may detect the amplitude variation of the compressed echo signal 404. The detection module 316 may produce a control signal resembling variations as in the received echo signal. It may be noted that the detection module 316 may be referred as an envelope detector.

Successively, the echo-stretch filter 318 stretches the compressed echo signal 404, at step S910. The compressed echo signal 404 is stretched to enhance the visibility. Further, the stretched echo signal 406 is then output to the display screen as the echo image corresponding to the object present within the water body.

Figure 10A:
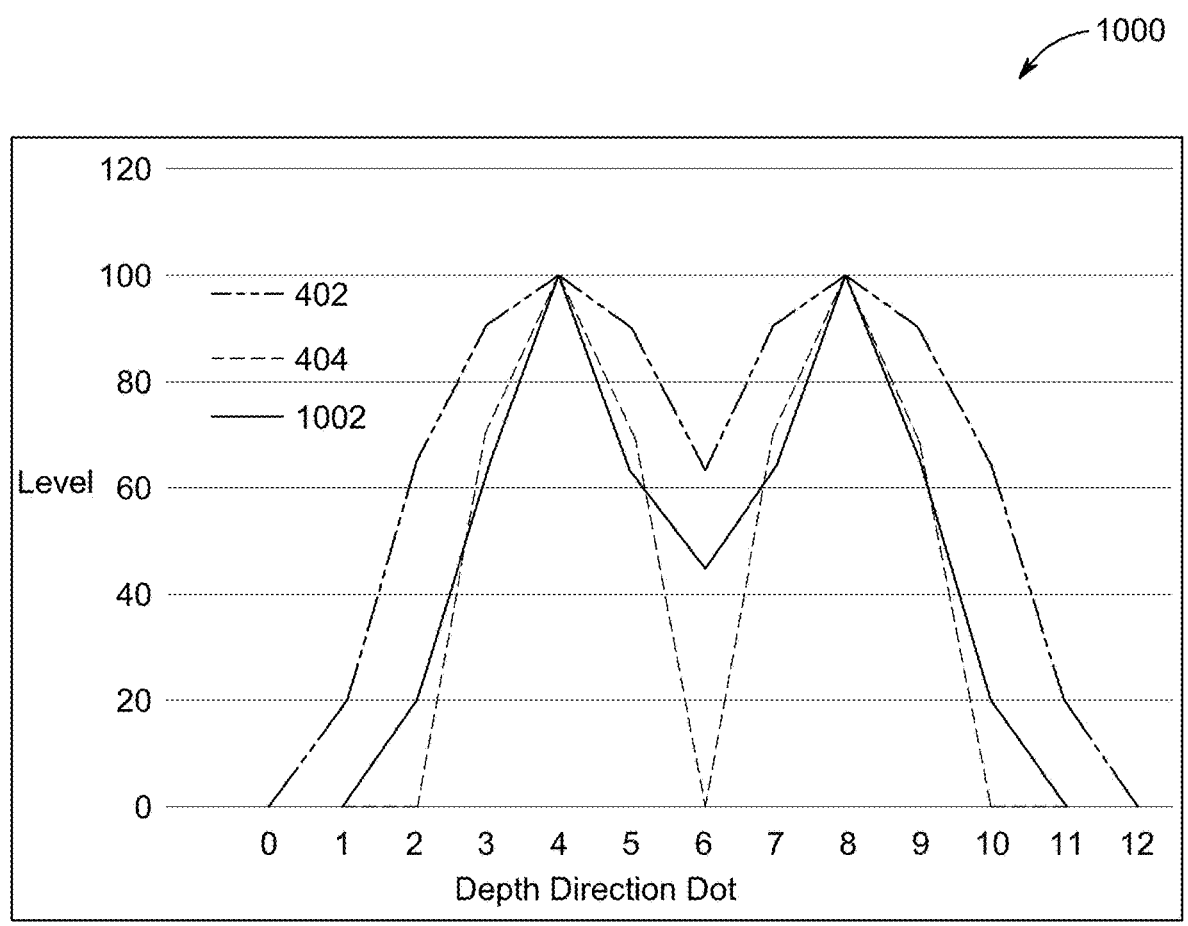
FIG. 10A is a graph showing shrinking of a compressed echo signal, according to another embodiment of the present disclosure.

FIG. 10A is a graph 1000 showing shrinking of the compressed echo signal 404, according to another embodiment of the present disclosure.

The graph 1000 represents depth direction dot along the abscissa and a level of depth along the ordinate. The values of weights for the transmission signal 402, the compressed echo signal 404 and a shortened echo signal 1002, as mentioned in table 1004 of FIG. 10B. It may be noted that the values of S(n)=T(n) when the target is on its peak. For example, S(4)=S(8)=100.

As discussed above, the transmission signal 402, may be improved by expanding/extending/stretching the compressed echo signal 404 after pulse compression to enhance visibility. Referring to FIGS. 10A-10B, alternatively, a method may also be conceivable by shortening/shrinking the transmission pulse width with the weighted minimum filter to separate or distinguish an individual fish. The shortened or shrunken signal may be intermediatory of the wide transmission signal 402 and short compressed echo signal 404.

Referring to FIG. 10B, each value S(n) of the dot (n) of the shortened or shrunken signal is filtered by the echo-stretch filter 318 by a minimum weighted filtering of the values of corresponding dots of the compressed echo signal 404 with the group of weighted elements using an equation (3).

$$S(n)=\text{MIN}[1.0 \times T(n-1), 0.7 \times T(n), 1.0 \times (n+1)] \quad (3)$$

Further, in shortening/shrinking of the transmission pulse width with the weighted minimum filter, the peak value T(n) of the transmission signal 402 of the dot (n) is filtered to keep the value S(n) of a shortened echo signal 1002 for the corresponding dot (n) at the same peak level. For example, peak value T(4) of the transmission signal 402 corresponding to the dot (n=4) is filtered to keep the same value S(4) of the shortened echo signal 1002 for the corresponding dot (n=4). Similarly, peak value T(8) of the transmission signal 402 corresponding to the dot (n=8) is filtered to keep the same value S(8) of the shortened echo signal 1002 for the corresponding dot (n=8), as shown in table 1004 of the FIG. 10B.

Therefore, value T(n) of the transmission signal 402 for dot (n) is same as the value S(n) of the shortened echo signal 1002 for the corresponding dot (n) if the T(n) is at a peak level of 100. Alternatively, when T(n−1)<T(n)∩T(n+1)<T(n), S(n)=T(n) then value T(n) of the transmission signal 402 for dot (n) is same as the value S(n) of the shortened echo signal 1002 for the corresponding dot (n). In other cases, the minimum weighted filtering is performed and values S(n) of the shortened echo signal 1002 are determined using the equation (3).

The above embodiments are exemplary in all respects and are not restrictive. The scope of the invention is set forth in the claims, not in the above description, and includes the meaning of and all variations within the scope of the claims.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey those certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A transceiver system of a pulse signal, comprising:
   a transmission signal generator configured to generate a transmission signal;
   a transceiver configured to
   transmit a pulse signal corresponding to the transmission signal; and
   receive an echo signal corresponding to the transmission signal from a detection range;
   a pulse compression filter configured to compress the echo signal received by the transceiver; and
   an echo-stretch filter configured to stretch the compressed echo signal with a group of weight elements being set larger for a center and being set smaller for edge sides in a depth direction.

2. The transceiver system of claim 1, wherein
   the transmitted pulse signal is having substantially a same waveform as a waveform of the transmission signal.

3. The transceiver system of claim 1, wherein
   the echo-stretch filter is a weighted maximum value filter.

4. The transceiver system of claim 1, wherein
   the echo-stretch filter is configured to
   calculate a difference between a pulse width of the compressed echo signal and a pulse width of the transmitted pulse signal in terms of a number of dots; and
   determine a filter length based on the calculated difference.

5. The transceiver system of claim 4, wherein
   the filter length is set in a depth direction, for correcting the pulse width of the compressed echo signal being shortened by pulse compression.

6. The transceiver system of claim 1, wherein
   the echo-stretch filter is further configured to
   stretch the compressed echo signal with the group of weight elements being set larger for a newer pings and smaller for older pings in a time direction.

7. The transceiver system of claim 1, wherein
   a maximum value of each weight element of the group of weight elements is set to 1.

8. The transceiver system of claim 1, wherein
   the echo-stretch filter is further configured to
   calculate a filter range;
   determine a threshold level of dots; and
   stretch the compressed echo signal when the dots having a level higher than the threshold level of dots present in the filter range to prevent noise from being emphasized.

9. The transceiver system of claim 1 is further comprising:
   an envelope detector configured to detect amplitude variations of the compressed echo signal to produce a control signal resembling variations as in the received echo signal.

10. A method for stretching a compressed echo signal, the method comprising:
    generating a transmission signal, using a transmission signal generator;
    transmitting, via a transceiver, a pulse signal corresponding to the transmission signal;
    receiving, via the transceiver, an echo signal corresponding to the transmission signal from a detection range;
    compressing the received echo signal, using a pulse compression filter; and
    stretching the compressed echo signal with a group of weight elements being set larger for a center and being set smaller for edge sides in a depth direction, using an echo-stretch filter.

11. The method of claim 10, wherein
    the transmitted pulse signal is having substantially a same waveform as a waveform of the transmission signal.

12. The method of claim 10, wherein
    the echo-stretch filter is a weighted maximum value filter.

13. The method of claim 10, further comprising:
    calculating a difference between a pulse width of the compressed echo signal and a pulse width of the transmitted signal in terms of a number of dots; and
    determining a filter length based on the calculated difference.

14. The method of claim 13, wherein
    the filter length is set in a depth direction, for correcting the pulse width of the compressed echo signal being shortened by pulse compression.

15. The method of claim 10, further comprising
    stretching the compressed echo signal with the group of weight elements that are set larger for a newer pings and smaller for older pings in a time direction, using the echo-stretch filter.

16. The method of claim 10, wherein
    a maximum value of each weight element of the group of weight elements is set to 1.

17. The method of claim 10, further comprising:
    calculating a filter range;
    determining a threshold level of dots; and
    stretching the compressed echo-signal when the dots having a level higher than the threshold level of dots present in the filter range to prevent a noise from being emphasized.

18. The method of claim 10, further comprising:
    detecting amplitude variations of the compressed echo signal to produce a control signal resembling variations as in the received echo signal, using an envelope detector.

19. A non-transitory computer readable medium storing instruction that, when executed by a transceiver system, to perform a method that comprises:
    generating a transmission signal, using a transmission signal generator;
    transmitting, via a transceiver, a pulse signal corresponding to the transmission signal;
    receiving, via the transceiver, an echo signal corresponding to the transmission signal from a detection range;
    compressing the received echo signal, using a pulse compression filter; and stretching the compressed echo signal with a group of weight elements being set larger for a center and being set smaller for edge sides in a depth direction, using an echo-stretch filter.

* * * * *